United States Patent [19]
Hirs

[11] 3,744,315
[45] July 10, 1973

[54] METHOD AND A DEVICE FOR DETERMINING THE TEMPERATURE AT VISCOSITY MEASUREMENTS

[75] Inventor: Gilles Gerardus Hirs, Pijnacker, Netherlands

[73] Assignee: Nederlands Organisatie Voor Toegepast Natuurwetenschappelijk Onderzoek Ten Behoere Van Nijverheid, Handel en Verkeer, Hague, Netherlands

[22] Filed: Dec. 10, 1970

[21] Appl. No.: 96,921

[30] Foreign Application Priority Data
Dec. 12, 1969 Netherlands................ 6918731

[52] U.S. Cl.................. 73/344, 73/54, 73/357
[51] Int. Cl.. G01k 11/00, G01k 13/02, G01n 11/04
[58] Field of Search............ 73/344, 357, 55, 73/54

[56] References Cited
UNITED STATES PATENTS
3,302,451  2/1967  Martin .................................. 73/55
3,314,294  4/1967  Colston ............................... 73/357
3,533,290  10/1970  Babcock et al. ...................... 73/357

Primary Examiner—Richard C. Queisser
Assistant Examiner—Frederick Shoon
Attorney—Hammond & Littell

[57] ABSTRACT

Two capillary-viscometers which are identical except for differing as regards the extent to which the width of their capillaries depends on the temperature, are simultaneously used for identical measurements under identical conditions. The ratio of the two measuring values is a direct indication for the exact temperature that exists in the viscometers.

6 Claims, 3 Drawing Figures

Patented July 10, 1973

3,744,315

INVENTOR.
GILLES GERARDUS HIRS
BY
Hammond and Littell
ATTORNEYS

METHOD AND A DEVICE FOR DETERMINING THE TEMPERATURE AT VISCOSITY MEASUREMENTS

The invention relates to a method for determining the temperature at viscosity measurements of liquids with the aid of viscometers of the type in which the liquid is fed through a capillary under the influence of a known difference in pressure and the rate of flow or a magnitude immediately related to it is measured.

It is known in the viscosity measurements art to place the viscometer in an environment that is kept at a controllable temperature, and to carry out the measurement when it may be assumed that the viscometer has adopted the ambient temperature.

This assumption constitutes an uncertain factor and may lead to errors that are unpermissable for accurate measurements.

Therefore it is of importance at viscosity measurements to know the exact temperature in the viscometer, because this opens up the possibility, to adjust and keep the temperature accurately at a desired value.

It is the object of the invention to provide for these temperature measurements a method that does not require special equipment but can be carried out with the viscometers themselves and simultaneously with the viscosity measurements.

To this end the method according to the invention is characterized in that two identical measurements are carried out with two viscometers that mutually differ as regards the extent to which the passage of their capillary is temperature-dependent and for the rest are identical to each other, and then the ratio of the two measuring results is determined as a measure for the temperature pertinent to the viscosity measurement.

For calculations have shown and experiments have borne it out that the ratio of the measuring results of two viscosity determinations that, besides a difference in passage between the capillaries used, are carried out under identical circumstances, depends exclusively on the above difference in passage and this dependency is linear, provided the difference is small in relation to the passage itself.

The direct result of this is that if the difference in passage is caused by a difference in temperature-dependence of the capillaries, there is also a linear relation between the ratio of the measuring results and the temperature in the viscometers.

This linear dependence holds good for viscometers in which a certain amount of liquid from a certain height flows through the capillary owing to its weight and in which the time required for it is determined, as well as for viscometers in which the slit between a stator and a turbine-like rotor serves as capillary and the rotation speed of the rotor is measured on feeding the liquid under a certain pressure.

As the above shows, with the aid of the method according to the invention an exact temperature determination in the viscometers, by the viscosity measurements themselves and without the necessity of accurate equipment for temperature measurements is possible.

The invention also relates to a device for the execution of the method described. This device is characterized by two capillary-viscometers whose two capillaries are shaped identical as a slit between an external body and an internal body at least partially embraced by the former and in which device by application of different materials the difference in thermal coefficients of expansion between the two bodies that together form a capillary, in the one viscometer is different from that in the other.

By making in such a device the two bodies, which together form a capillary, in the one viscometer of the same material and in the other viscometer of materials with a difference in coefficients of expansion, in the first viscometer the capillary is not temperature-sensitive and in the second it is, though, causing the desired effect to arise. In this instance the measuring result of the first viscometer determines the viscosity of the liquid and the ratio of the two measuring results the actual temperature at which the viscosity measurement was carried out.

If for the two bodies that form the capillary in the one visco-meter, two different materials are chosen and the same materials are applied in the other viscometer but reversed, the temperature-sensitivity is twice that of the above example. Then the viscosity of the liquid follows from the mean value of the two measuring results.

Starting from the well-established construction of capillary viscometers the temperature-sensitivity of the device according to the invention can already amount to some percents. per centigrade. The sensitivity can be considerably raised, however, by applying special appropriate constructions.

For reliable measurements it is of importance that, mutually, the viscometers do not show any appreciable differences in temperature.

Therefore for both, the conditions should be the same as nearly as possible, which for instance is attained by placing them together in a small room, which is kept at a constant temperature and screened from radiant heat.

A still better safeguard against undesirable differences in temperature is obtained by uniting the two viscometers such according to a further characteristic of the invention that at least one of the bodies that form the capillary in the one viscometer has substantial thermal contact with one, preferably the corresponding one, of the bodies that form the capillary in the other viscometer. If for two corresponding bodies in the two viscometers the same material is chosen and this material has a good heat conductivity, an optimum safeguarding against differences in temperature is realized if these two bodies are in one piece.

It is possible to join more than two viscometers in the way as described if special circumstances or requirements pertain, for instance for neutralizing interfering thermal or other influences.

The materials that are used for the bodies that form the capillaries may be of several types. In general metals are the most suitable because of their heat conductivity and their processability into smooth surfaces. Preferably various types of rustproof metal are applied so as to prevent changes in the width of the capillary caused by deposits on the surface which could also effect the surface. Other materials, however, such as plastics and ceramic materials, provided with a coating of a different material, if necessary, may also be applied to meet particular demands in view of, for instance, chemical activity of the liquid or extreme temperatures.

The invention is further elucidated below with reference to the drawing. In it

Figure 3:
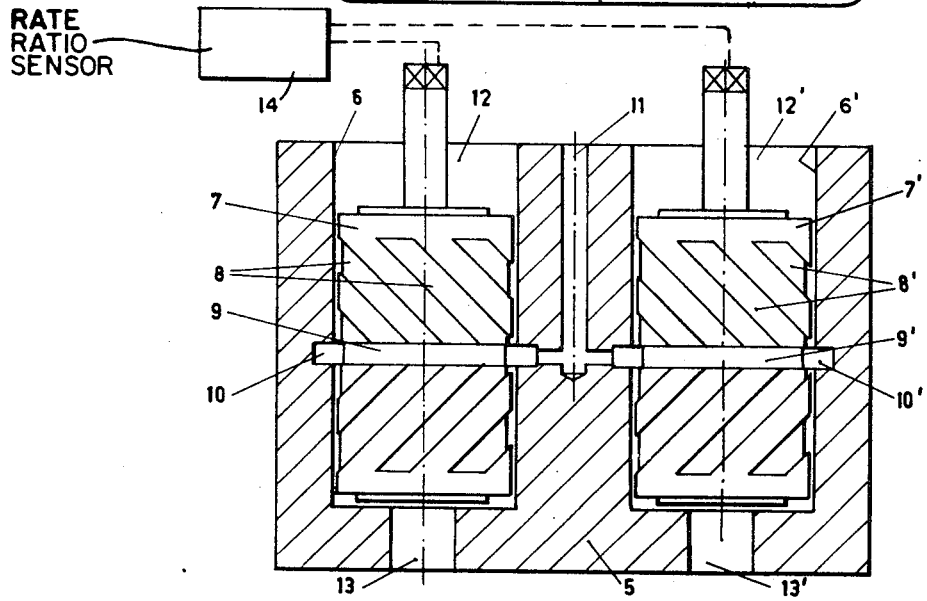

FIG. 3 in cross-section shows a device according to the invention composed of a different type of viscometers.

Figure 1:
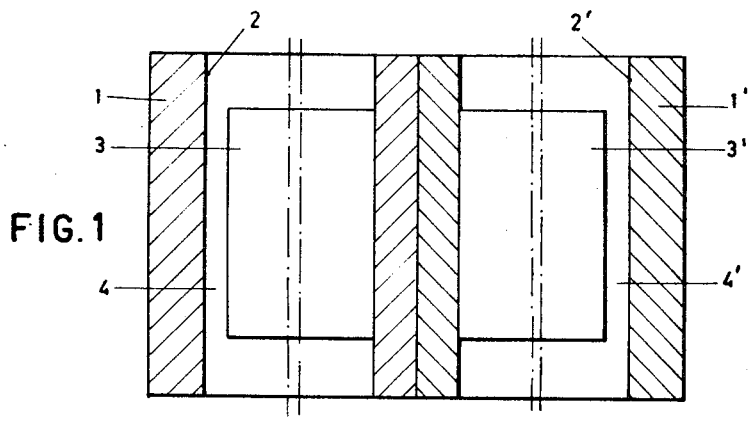
FIG. 1 shows a part of a device according to the invention in cross-section.
Figure 2:
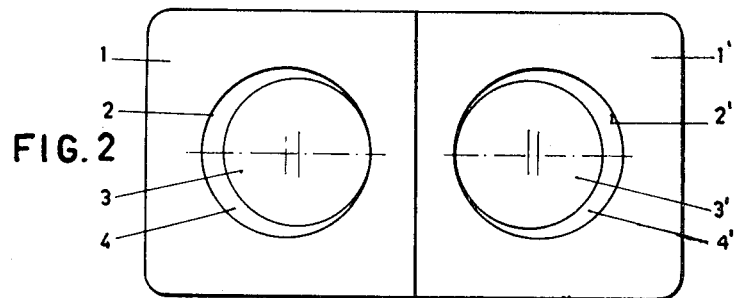
FIG. 2 shows an upper view of it.

The device of which FIGS. 1 and 2 show a part comprises two bodies 1 and 1', which with a flat side are attached or clamped to each other. Each of these bodies 1 and 1' has a bore, respectively 2 and, in which at one side is mounted a core, respectively 3, and in a way that is not specified.

Because cores 3 and 3' have a diameter, which is slightly smaller than that of bores 2 and 2' there is a slit, respectively 4 and between cores 3 respectively and 3 and bores 2 and 2 respectively. These slits 4 and 4' are the measuring capillaries of two viscometers, which for that purpose in the usual way are provided with means, not shown in the drawing, so as to feed a liquid at a certain pressure and means for determining flow parameters.

The width of slits 4 and 4' is chosen in dependence on the circumstances, such as the nature of the liquids for which the device is intended and may, for instance, amount to 10 to 100 $\mu$. In the drawing the width of slits 4 and 4' is shown strongly enlarged.

In the event of changes in temperature of the two viscometers the diameter of bores 2 and 2' and that of cores 3 and 3' change. If body 1 and core 3 are of a material with the same thermal coefficient of expansion, these changes in diameter do not affect the width of slit 4. In the event of a difference in coefficient of expansion the width of the slit changes in proportion to the changes in temperature and the difference in coefficient of expansion and a different measuring result is obtained.

If between body 1' and core 3' there is the same difference in coefficient of expansion, the measuring result that is obtained with slit 4' changes to the same extent as in the event of slit 4. If here the difference in coefficient of expansion is different, however, the change in the width of slit 4' is not the same as that of slit 4 and two different measuring results are obtained, too.

When with two capillaries with somewhat unequal widths but for otherwise identical conditions the same measurement is carried out, two different measuring results are obtained, whose quotient is independent of the rest of the variable magnitudes, such as the viscosity of the liquid and the pressure with which this is fed through the capillaries. As the difference in slit width in the device described is the result of the difference in temperature-dependence between slits 4 and 4', the above means that the quotient of the two measuring results is a direct indication for the extent to which the existing temperature differs from the temperature at which slits 4 and 4' have the same width.

So as to realize the desired difference in temperature-sensitivity of slits 4 and 4', for instance, bodies 1 and 1' and core 3 may be of the same material and core 3' of a material with a different coefficient of expansion. Then there is the advantage that slit 4 is insensitive to changes in temperature, so that the measuring result obtained with it determines the viscosity sought.

A greater sensitivity is obtained by making body 1 and core 3' of the one material and body 1' and core 3 of the other material so that at a change in temperature the width of the one slit increases as much as the width of the other slit decreases.

In the device of which FIG. 3 shows a cross-section, two viscometers are applied of a type with a freely rotating rotor.

In body 5 two bores 6 and 6' are provided in which rotors 7 and 7' fit with a slight clearance. Rotors 7 and 7' have helical grooves 8 respectively 8' and a deeper groove 9 respectively 9'. Bores 6 and 6' are provided with corresponding circular grooves 10 respectively 10', which both communicate with liquid feeding duct 11 over and under rotors 7 and 7' bores 6 and 6' have open liquid discharges 12 and 12' respectively 13 and 13'.

On feeding a liquid under pressure via duct 11 and grooves 10 and 10' to the slit between each of rotors 7 and 7' and bores 6 and 6' in them a pressure build-up arises that centers and supports rotors 7 and 7', so that they have no direct contact with body 5.

Owing to the flow of liquid that occurs in the slits in the direction of the discharges and the presence of helical grooves 8 and 8' rotors 7 and 7' begin to rotate. The speed with which they rotate depends on the rate of flow in the slits and so, at a given pressure, on the viscosity of the liquid.

If rotor 7 consists of the same material as body 5, the width between bore 6 and rotor 7 is not affected by changes in temperature. If, on the contrary, rotor 7' is of a material with a greater coefficient of expansion than the material of body 5, then at a rise in temperature the slit between bore 6' and rotor 7' becomes smaller, causing the rate of flow of the liquid and the rate of rotation of rotor 7' immediately related to it to decrease.

This change in rate of rotation is only dependent on the change in slit width and so on the change in temperature. The result is that the ratio of the rates of rotation of rotors 7 and 7' sensed by rate ratio sensor 14 gives a direct indication about the extent to which the temperature in the viscometers differs from the temperature at which the two viscometers have the same slit width.

I claim:

1. A device for determining the temperature at which viscosity measurements of liquids are made comprising two capillary-viscometers whose two capillaries are identically shaped and each formed as a slit between an external body and an internal body at least partially embraced by the external body, the two bodies that together form a capillary in the one viscometer having a thermal coefficient of expansion different from the two bodies forming the other capillary, and means to determine the ratio of said viscosity measurements to produce said temperature determination.

2. A device according to claim 1, wherein at least one of the bodies that constitute the capillaries of the two viscometers partially consists of a material whose thermal coefficient of expansion differs from the material of which the rest of the bodies consists.

3. A device according to claim 1, wherein the external and internal bodies that together form a capillary in one viscometer have different thermal coefficients of expansion, and the external and internal bodies that together form the other capillary in the other viscometer each have a coefficient of expansion equal to that of the opposite respective body in said first capillary.

4. A device according to claim 1 wherein at least one of the bodies that form the capillary in one viscometer has a substantial thermal contact with one of the bodies that form the capillary in the other viscometer.

5. A device according to claim 4, wherein at least one of the bodies that form the one capillary and the corresponding one of the bodies that form the other capillary both consist of thermally conductive material.

6. A method for determining the temperature at which viscosity measurements of liquids are made with capillary viscometers which comprises feeding liquid through two capillaries under the influence of a known difference in pressure and simultaneously measuring the flow rate or a value related to the flow rate, the two viscometers being identical except for different capillary temperature dependence and determining the ratio between said measurements whereby the ratio of the measured flow rates measures the temperature pertinent to the viscosity measurement.

* * * * *